United States Patent
Conti et al.

(10) Patent No.: US 10,394,701 B2
(45) Date of Patent: Aug. 27, 2019

(54) USING RUN TIME AND HISTORICAL CUSTOMER PROFILING AND ANALYTICS TO ITERATIVELY DESIGN, DEVELOP, TEST, TUNE, AND MAINTAIN A CUSTOMER-LIKE TEST WORKLOAD

(71) Applicant: International Business Machines Corporation, Armonk, NY (US)

(72) Inventors: Thomas W. Conti, Poughkeepsie, NY (US); Kyle R. Moser, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 15/264,631

(22) Filed: Sep. 14, 2016

(65) Prior Publication Data

US 2018/0074947 A1 Mar. 15, 2018

(51) Int. Cl.
*G06F 11/00* (2006.01)
*G06F 11/36* (2006.01)

(52) U.S. Cl.
CPC .......... *G06F 11/3688* (2013.01); *G06F 11/36* (2013.01); *G06F 11/3664* (2013.01); *G06F 11/3684* (2013.01); *G06F 11/3692* (2013.01)

(58) Field of Classification Search
CPC .......... G06F 17/30578; H04L 41/5003; H04L 41/5009; H04L 41/5067; H04L 41/5083; H04L 43/16; H04L 43/18; H04L 43/1025; H04L 43/327

See application file for complete search history.

(56) References Cited

U.S. PATENT DOCUMENTS

| | | | | |
|---|---|---|---|---|
| 5,881,238 A | * | 3/1999 | Aman | G06F 9/505 709/226 |
| 6,167,427 A | * | 12/2000 | Rabinovich | H04L 67/1002 707/999.202 |
| 6,351,775 B1 | * | 2/2002 | Yu | H04L 67/1008 370/237 |
| 6,981,180 B1 | * | 12/2005 | Bailey | H04L 41/145 714/38.11 |

(Continued)

OTHER PUBLICATIONS

Yu, "Understanding User Behavior in Large-Scale Video-on-Demand Systems" Apr. 2006, ACM, 333-344 (Year: 2006).*

(Continued)

Primary Examiner — Bryce P Bonzo
Assistant Examiner — Jeison C. Arcos
(74) Attorney, Agent, or Firm — Cantor Colburn LLP; William Kinnaman

(57) ABSTRACT

Aspects of the present invention include a method, system and computer program product. The method includes a processor determining characteristics of one or more customer workloads to be incorporated into a customer-like test workload; determining one or more data points for environment and workload comparisons; collecting customer environment, workload, capacity and performance empirical data; developing a test workload; conducting historical and run-time workload profiling of the one or more customer workloads and the developed test workload; and determining that the developed test workload meets one or more customer workload attainment goals.

20 Claims, 4 Drawing Sheets

(56) References Cited

U.S. PATENT DOCUMENTS

| | | | |
|---|---|---|---|
| 7,003,504 B1 | 2/2006 | Angus et al. | |
| 7,080,378 B1* | 7/2006 | Noland | G06F 9/5083 709/224 |
| 7,475,157 B1* | 1/2009 | Tormasov | H04L 67/1008 709/227 |
| 7,561,988 B2 | 7/2009 | Matsunaga et al. | |
| 7,720,955 B1 | 5/2010 | Kelly et al. | |
| 7,860,097 B1* | 12/2010 | Lovett | H04L 12/4641 370/392 |
| 8,024,615 B2* | 9/2011 | Tarta | G06F 11/3672 702/182 |
| 8,417,715 B1 | 4/2013 | Bruckhaus et al. | |
| 8,781,977 B1 | 7/2014 | Huberman et al. | |
| 8,850,270 B2* | 9/2014 | Heiper | G06F 11/3676 714/37 |
| 9,317,407 B2* | 4/2016 | Sabin | G06F 11/3688 |
| 9,727,448 B1 | 8/2017 | Seibert, Jr. et al. | |
| 9,846,881 B2 | 12/2017 | Greene et al. | |
| 10,019,167 B2 | 7/2018 | Gray | |
| 2001/0013008 A1* | 8/2001 | Waclawski | G06F 11/3409 702/186 |
| 2002/0156663 A1 | 10/2002 | Weber et al. | |
| 2002/0170022 A1 | 11/2002 | Shirai et al. | |
| 2004/0044744 A1* | 3/2004 | Grosner | H04L 29/06 709/217 |
| 2005/0187990 A1 | 8/2005 | Pace | |
| 2006/0095311 A1* | 5/2006 | Thompson | G06Q 10/06 705/7.16 |
| 2006/0095312 A1* | 5/2006 | Conti | G06F 11/3672 717/124 |
| 2007/0022426 A1* | 1/2007 | Steinder | G06F 9/505 718/104 |
| 2007/0276871 A1 | 11/2007 | Fu | |
| 2008/0028409 A1* | 1/2008 | Cherkasova | G06F 9/5061 718/104 |
| 2008/0189350 A1* | 8/2008 | Vasa | H04L 41/5003 709/201 |
| 2011/0231822 A1 | 9/2011 | Sabin et al. | |
| 2012/0095956 A1 | 4/2012 | Xiong et al. | |
| 2012/0110589 A1 | 5/2012 | Ghosh et al. | |
| 2012/0131104 A1 | 5/2012 | Beaven et al. | |
| 2013/0007126 A1 | 1/2013 | Ziemann | |
| 2013/0073473 A1 | 3/2013 | Heath | |
| 2013/0162444 A1* | 6/2013 | Boulanger | H04Q 9/00 340/870.03 |
| 2013/0185021 A1 | 7/2013 | Addison et al. | |
| 2013/0212264 A1* | 8/2013 | Troppens | H04L 61/1511 709/224 |
| 2014/0033055 A1 | 1/2014 | Gardner et al. | |
| 2014/0047272 A1* | 2/2014 | Breternitz | G06F 11/3495 714/32 |
| 2014/0109002 A1 | 4/2014 | Kimball | |
| 2014/0337429 A1 | 11/2014 | Asenjo et al. | |
| 2014/0344787 A1 | 11/2014 | Cochrane et al. | |
| 2015/0032691 A1* | 1/2015 | Hall | H04L 29/06 707/610 |
| 2015/0046363 A1 | 2/2015 | McNamara et al. | |
| 2015/0113162 A1* | 4/2015 | Chan | H04L 67/1008 709/238 |
| 2015/0229582 A1 | 8/2015 | Zhu et al. | |
| 2015/0317337 A1 | 11/2015 | Edgar | |
| 2015/0363348 A1 | 12/2015 | Haynes | |
| 2016/0188370 A1 | 6/2016 | Razin et al. | |
| 2016/0224392 A1* | 8/2016 | Clarke | G06F 9/505 |
| 2016/0231999 A1 | 8/2016 | Holler et al. | |
| 2016/0357660 A1* | 12/2016 | Dean | G06F 11/3692 |
| 2017/0250885 A1 | 8/2017 | Donovan | |
| 2018/0284756 A1 | 10/2018 | Cella et al. | |

OTHER PUBLICATIONS

List of IBM Patents or Patent Applications Treated As Related (Appendix P), Filed Jan. 4, 2017, 2 pages.

Thomas R. Brown, et al., Pending U.S. Appl. No. 15/197,826 Entitled "Run Time Workload Threshold Alerts for Customer Profiling Visualization" filed Jun. 30, 2016.

Thomas R. Brown, et al., Pending U.S. Appl. No. 15/197,828 Entitled "Run Time and Historical Workload Report Scores for Customer Profiling Visualization" filed Jun. 30, 2016.

Thomas R. Brown, et al., Pending U.S. Appl. No. 15/197,835 Entitled "Z/OS SMF/RMF Workload Data Playback with Web Dashboard Visualization" filed Jun. 30, 2016.

Thomas R. Brown, et al., Pending U.S. Appl. No. 15/264,629 Entitled "Using Customer Profiling and Analytics to Create a Relative, Targeted, and Impactful Customer Profiling Environment/ Workload Questionnaire" filed Sep. 14, 2016.

Thomas W. Conti, et al., Pending U.S. Appl. No. 15/197,827 Entitled "Run Time Test Workload Customer Profiling Baselines Visualization" filed Jun. 30, 2016.

Thomas W. Conti, et al., Pending U.S. Appl. No. 15/197,829 Entitled "Run Time Automatic Workload Tuning Using Customer Profiling Workload Comparison" filed Jun. 30, 2016.

Thomas W. Conti, et al., Pending U.S. Appl. No. 15/197,831 Entitled "Using Test Workload Run Facts and Problem Discovery Data as Input for Business Analytics to Determine Test Effectiveness" filed Jun. 30, 2016.

Thomas W. Conti, et al., Pending U.S. Appl. No. 15/197,833 Entitled "Run Time TPNS Workload Controls for Test Workload Tuning in Relation to Customer Profiling Workload" filed Jun. 30, 2016.

Thomas W. Conti, et al., Pending U.S. Appl. No. 15/197,843 Entitled "Visual Test Workload Execution Modeling" filed Jun. 30, 2016.

Thomas W. Conti, et al., Pending U.S. Appl. No. 15/197,844 Entitled "Run Time SMF/RMF Statistical Formula Methodology for Generating Enhanced Workload Data Points for Customer Profiling Visulization" filed Jun. 30, 2016.

Thomas W. Conti, et al., Pending U.S. Appl. No. 15/259,094 Entitled "Z/OS SMF Record Navigation Visualization Tooling" filed Sep. 8, 2016.

Thomas W. Conti, et al., Pending U.S. Appl. No. 15/259,099 Entitled "Measuring and Optimizing Test Resources and Test Coverage Effectiveness Through Run Time Customer Profiling and Analytics" filed Sep. 8, 2016.

Thomas W. Conti, et al., Pending U.S. Appl. No. 15/259,104 Entitled "Using Customer Profiling and Analytics to Understand, Rank, Score, and Visualize Best Practices" filed Sep. 14, 2016.

Thomas W. Conti, et al., Pending U.S. Appl. No. 15/259,107 Entitled "Using Best Practices Customer Adoption Business Intellegence Data as Input to Enterprise Resource Planning (ERP)" filed Sep. 8, 2016.

Thomas W. Conti, et al., Pending U.S. Appl. No. 15/259,110 Entitled "Using Run Time and Historical Customer Profiling and Analytics to Determine Customer Test vs. Production Differences, and to Enhance Customer Test Effectiveness" filed Sep. 8, 2016.

Thomas W. Conti, et al., Pending U.S. Appl. No. 15/259,115 Entitled "Using Run Time and Historical Customer Profiling and Analytics to Determine Customer Disaster Recovery vs Production Differences, and to Enhance Customer Disaster Recovery Readiness and Effectiveness" filed Sep. 8, 2016.

Thomas W. Conti, et al., Pending U.S. Appl. No. 15/259,120 Entitled "Determining If Customer Characteristics by Customer Gography, Country, Culture or Industry May Be Further Applicable to a Wider Customer Set" filed Sep. 8, 2016.

Thomas W. Conti, et al., Pending U.S. Appl. No. 15/259,122 Entitled "Using Customer and Workload Profiling and Analytics to Determine Score, and Report Portability of Customer and Test Environments and Workloads" filed Sep. 8, 2016.

Thomas W. Conti, et al., Pending U.S. Appl. No. 15/259,124 Entitled "Using Customer Profiling and Analytics to Understand Customer Workload Complexity and Characteristics by Customer Geography, Country, and Cuture" filed Sep. 8, 2016.

Thomas W. Conti, et al., Pending U.S. Appl. No. 15/259,130 Entitled "Using Workload Profiling and Analytics and Score Complexity of Test Environments and Workloads" filed Sep. 8, 2016.

(56) References Cited

OTHER PUBLICATIONS

Thomas W. Conti, et al., Pending U.S. Appl. No. 15/259,168 Entitled "Using Customer Profiling and Analytics to Understand Customer Environment and Workload Complexity and Characteristics by Industry" filed Sep. 8, 2016.
Thomas W. Conti, et al., Pending U.S. Appl. No. 15/264,630 Entitled "Using Customer Workload Profiling and Analytics to understand and Visualize Customer Workload Execution" filed Sep. 14, 2016.
Thomas W. Conti, et al., Pending U.S. Appl. No. 15/264,632 Entitled "Using Customer Profiling and Analytics to More Accurately Estimate and Generate and Agile Bill of Requirements and Sprints for Customer or Test Workload Port" filed Sep. 14, 2016.
Thomas W. Conti, et al., Pending U.S. Appl. No. 15/264,634 Entitled "Standardizing Run-Time and Historical customer and Test Environments and Workloads Comparisons Using Specific Sets of Key Platform Data Points" filed Sep. 14, 2016.
Thomas W. Conti, et al., Pending U.S. Appl. No. 15/264,638 Entitled "Using Run-Time and Historical Custome Profiling and Analytics to Determine and Score Customer Adoption Levels of Platform Technologies" filed Sep. 14, 2016.
Thomas W. Conti, et al., Pending U.S. Appl. No. 15/264,639 Entitled "Standardizing Customer and Test Data and Information Collection for Runtime and Historical Profiling Environments and Workload Comparisons" filed Sep. 14, 2016.
List of IBM Patents or Patent Applications Treated As Related (Appendix P), Filed Apr. 19, 2017, 2 pages.
Thomas R. Brown, et al., Pending U.S. Appl. No. 15/424,971 Entitled "Run Time Workload Threshold Alerts or Customer Profiling Visualization" filed Feb. 6, 2017.
Thomas R. Brown, et al., Pending U.S. Appl. No. 15/427,129 Entitled "Run Time and Historical Workload Report Scores for Customer Profiling Visualization" filed Feb. 8, 2017.
Thomas W. Conti, et al., Pending U.S. Appl. No. 15/424,965 Entitled "Using Customer Profiling and Analytics o Understand Customer Environment and Workload Complexity and Characteristics by Industry" filed Feb. 6, 2017.
Thomas W. Conti, et al., Pending U.S. Appl. No. 15/424,973 Entitled "Run Time Test Workload Customer Profiling Baselines Visualization" filed Feb. 6, 2017.
Thomas W. Conti, et al., Pending U.S. Appl. No. 15/427,130 Entitled "Visual Test Workload Execution Modeling" filed Feb. 8, 2017.
Thomas W. Conti, et al., Pending U.S. Appl. No. 15/427,135 Entitled "Run Time Automatic Workload Tuning Using Customer Profiling Workload Comparison" filed Feb. 8, 2017.
Thomas W. Conti, et al., Pending U.S. Appl. No. 15/427,137 Entitled "Using Test Workload Run Facts and Problem Discovery Data as Input for Business Analytics to Determine Test Effectiveness" filed Feb. 8, 2017.
Thomas W. Conti, et al., Pending U.S. Appl. No. 15/429,262 Entitled "Measuring and Optimizing Test Resources and Test Coverage Effectiveness Through Run Time Customer Profiling and Analytics" filed Feb. 10, 2017.
Thomas W. Conti, et al., Pending U.S. Appl. No. 15/429,265 Entitled "Using Run Time and Historical Customer Profiling and Analytics to Determine Customer Disaster Recovery vs Production Differences, and to Enhance Customer Disaster Recovery Readiness and Effectiveness" filed Feb. 10, 2017.
Thomas W. Conti, et al., Pending U.S. Appl. No. 15/429,268 Entitled "Using Workload Profiling and Analytics and Score Complexity of Test Environments and Workloads" filed Feb. 10, 2017.
Dias, "Make the Azure Portal Dashboard your own", Nov. 30, 2015, 7 pages.
Yu, "Understanding User Behavior in Large-Scale Video-on-Demand Systems," Apr. 2006, ACM, pp. 333-344.

\* cited by examiner

US 10,394,701 B2

USING RUN TIME AND HISTORICAL CUSTOMER PROFILING AND ANALYTICS TO ITERATIVELY DESIGN, DEVELOP, TEST, TUNE, AND MAINTAIN A CUSTOMER-LIKE TEST WORKLOAD

BACKGROUND

The present invention relates to the testing of software, hardware, firmware, and/or other disciplines, and more specifically, to a method, system and computer program product that implement aspects of workload and operational profiling, coupled with business analytics, thereby resulting in improvements in the testing of customer software.

In the field of software testing, as in many other technical fields, improvements are constantly being sought, primarily for cost and accuracy reasons. A fundamental goal of software testing in theory is to identify all of the problems in a customer's software program before the program is released for use by the customer. However, in reality this is far from the case as typically a software program is released to the customer having some number of problems that were unidentified during the software development and testing process.

A relatively more proactive approach to improving software testing is sought that employs traditional methods of understanding characteristics of clients' environments, augmented with a process of data mining empirical systems data. Such client environment and workload profiling analysis may result in software test improvements based on characteristics comparisons between the client and the test environments.

SUMMARY

According to one or more embodiments of the present invention, a computer-implemented method includes determining, by a processor, characteristics of one or more customer workloads to be incorporated into a customer-like test workload; determining, by the processor, one or more data points for environment and workload comparisons; and collecting, by the processor, customer environment, workload, capacity and performance empirical data. The method also includes developing, by the processor, a test workload; conducting, by the processor, historical and run-time workload profiling of the one or more customer workloads and the developed test workload; and determining, by the processor, that the developed test workload meets one or more customer workload attainment goals.

According to another embodiment of the present invention, a system includes a processor in communication with one or more types of memory, the processor configured to determine characteristics of one or more customer workloads to be incorporated into a customer-like test workload; to determine one or more data points for environment and workload comparisons; and to collect customer environment, workload, capacity and performance empirical data. The processor is further configured to develop a test workload; to conduct historical and run-time workload profiling of the one or more customer workloads and the developed test workload; and to determine that the developed test workload meets one or more customer workload attainment goals.

According to yet another embodiment of the present invention, a computer program product includes a non-transitory storage medium readable by a processing circuit and storing instructions for execution by the processing circuit for performing a method that includes determining characteristics of one customer workloads to be incorporated into a customer-like test workload; determining one or more data points for environment and workload comparisons; and collecting customer environment, workload, capacity and performance empirical data. The method also includes developing a test workload; conducting historical and run-time workload profiling of the one or more customer workloads and the developed test workload; and determining that the developed test workload meets one or more customer workload attainment goals.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
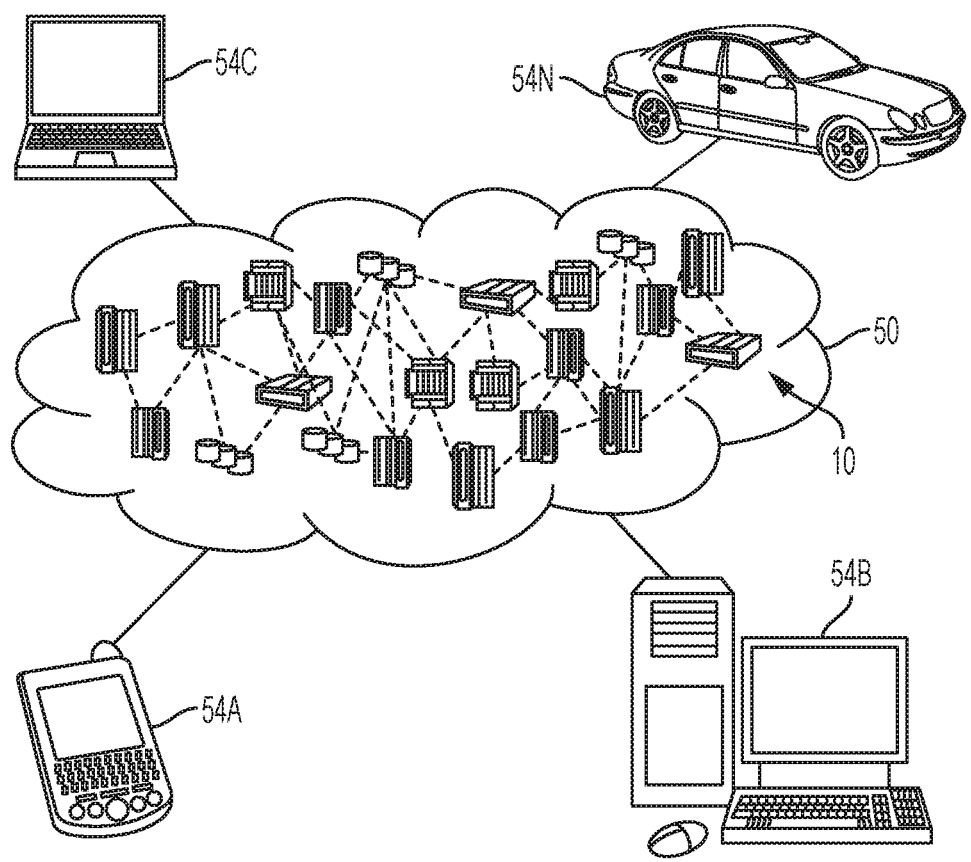
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
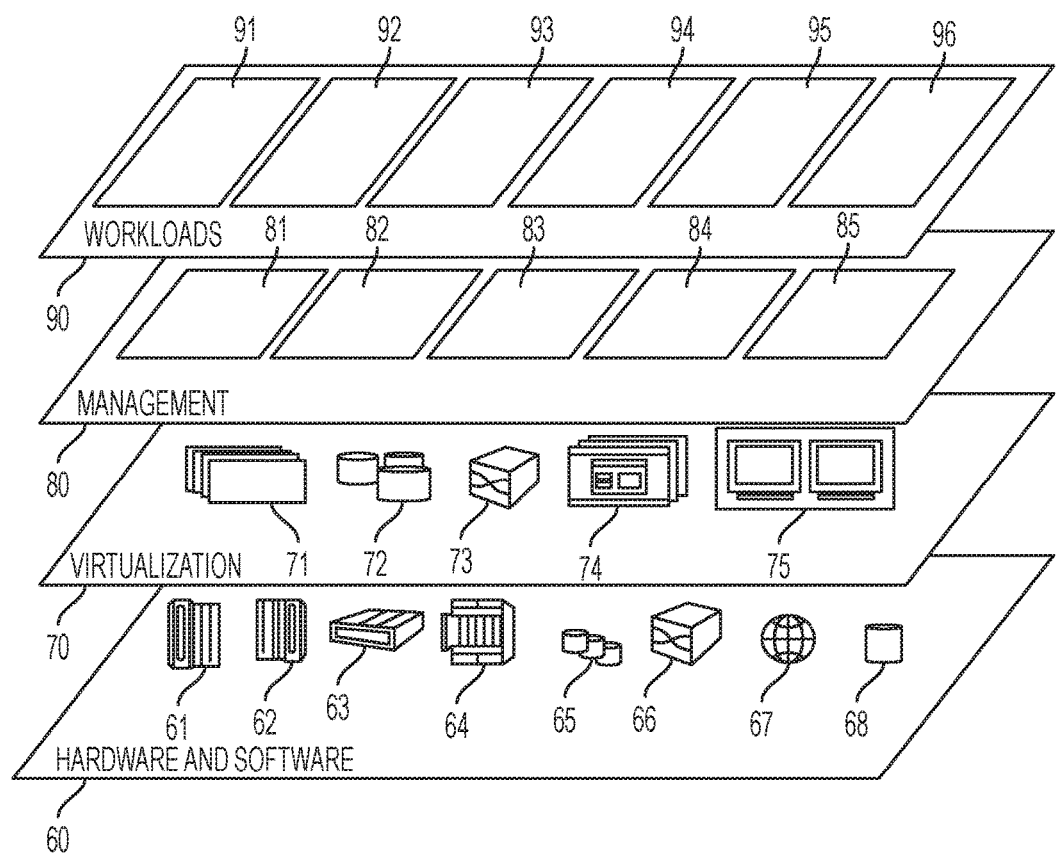
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for using runtime and historical customer profiling and analytics to iteratively design, develop, test, tune, and maintain a customer-like test workload in accordance with one or more embodiments of the present invention.

Figure 3:
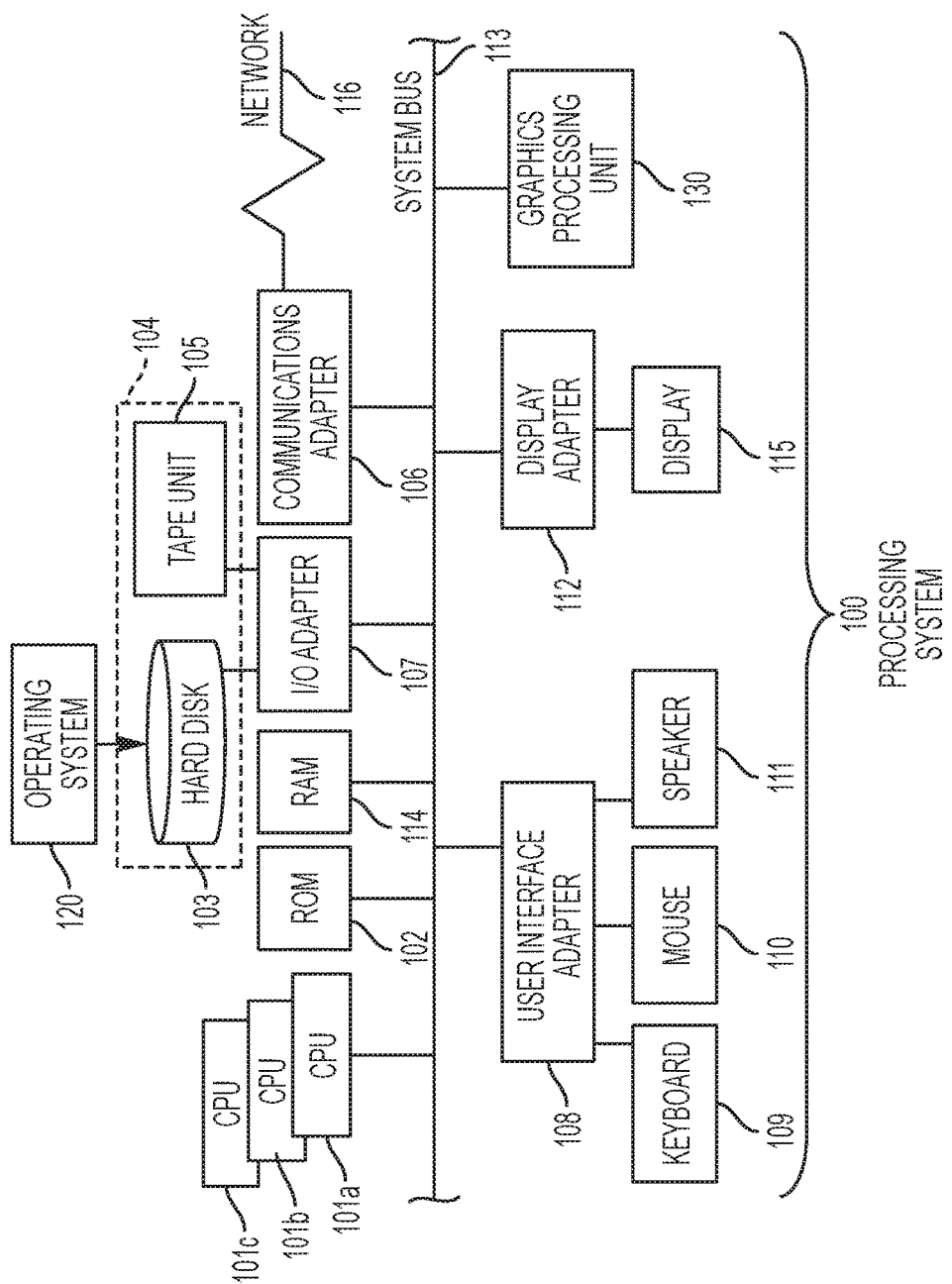
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for using runtime and historical customer profiling and analytics to iteratively design, develop, test, tune, and maintain a customer-like test workload in accordance with one or more embodiments of the present invention.

Figure 4:
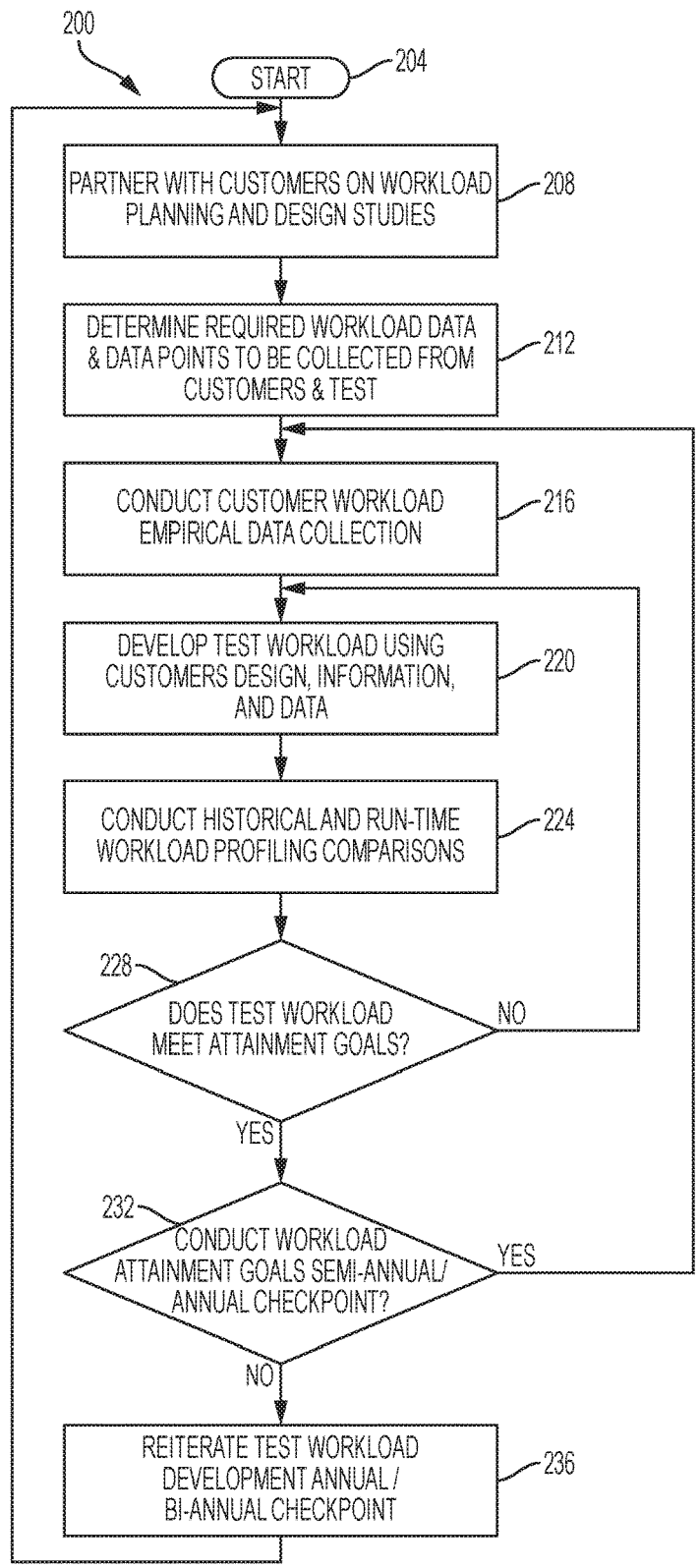
FIG. 4 is a flow diagram of a method for using run time and historical customer profiling and analytics to iteratively design, develop, test, tune, and maintain a customer-like test workload in accordance with one or more embodiments of the present invention.

With reference now to FIG. 4, a flow diagram illustrates a method 200 according to one or more embodiments of the present invention for using runtime and historical customer profiling and analytics to iteratively design, develop, test, tune, and maintain a reflective or customer-like test workload in key focus areas or characteristics, in accordance with one or more embodiments of the present invention.

In one or more embodiments of the present invention, the method 200 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 100 described hereinabove and illustrated in FIG. 3, or in some other type of computing or processing environment.

After a start operation in block 204, an operation in block 208 determines the one or more key or relatively important customer workloads' characteristics to be incorporated into the "customer-like" test workload and set attainment goals for this test workload. One exemplary way to accomplish this is for the business entity (e.g., IBM) to partner with one or more customers to conduct a comprehensive study or studies of the source customer workloads and environments to be emulated in the test workload to be developed. The customer workload design and planning study includes a variety of subject matter expert interviews and deep dive technical discussions with those customers whose workloads are to be incorporated into the "customer-like" test workload. Retain all of the structured and unstructured environment and workload design information (including application, transactions, and other levels) in database repositories that analytics (e.g., IBM Analytics) can use to draw relationships and insight into how to design and develop in an efficient and optimized manner.

An operation in block 212 determines one or more data points for environment and workload comparisons. In exemplary embodiments, this may be accomplished through consultation with customer and subject matter experts from each operational, environmental, workload, application, and/or functional areas where discussions or interviews are conducted. These data and data points are used for standardized customer and test comparisons and a fundamental component of the customer-like test workload design, development, and maintenance. These data and data points may be stored or retained in the same or related database repositories as the structured and unstructured environment and workload design information.

An operation in block 216 collects the customer environment, workload, capacity, and performance empirical data necessary for the development of the test workload. The customer environment and workload (e.g., platform or IBM System z) empirical data, is usually in the form of SMF, RMF, and other zStack product specific data or information. This data may be collected, for example, for normal and relatively high activity workload periods, and for one or more days, across multiple time frames. Examples of multiple time frames ideal for data collection can include quarter ends, heavy retail or banking days (such as, Black Friday and Digital Monday in the USA), year-end, national holidays, etc.

A standard set of SMF record types may be collected, independent of the workload to be designed and developed, to provide individual Systems and Sysplex configuration, environment, and utilization views. These SMF provided Systems and Sysplex views provide the foundation for the workload environment.

This collected customer data may be stored in a database as a preparation or prerequisite for workload profiling and analytics processing.

An operation in block 220 develops a test workload using the customer's data and information collected and determined in the operations in blocks 208, 212, and 216. Customer and test workload modeling comparisons may be conducted exploiting ease of use visualization and cognitive tooling, allowing the workload designers, developers, and testers to use the previously collected customer and test environment and workload empirical data in an intuitive manner, drawing key relationships between multiple data points, transactions, applications, and other workload components.

An operation in block 224 conducts historical and runtime workload profiling of the customer workloads and the developed test workload using a wide range of tools, processes, and analytics. This operation may continually tune and adjust the developed workload to meet functional coverage, stress and activity level, and other pertinent customer workload characteristics (i.e., the target "customer-like" attainment goals). This operation may involve conducting manual and automated workload tuning when and where needed, exploiting run time test workload customer profiling visualization tooling, and a variety of means to measure the "customer-likeness" of the test workload, including through the integrated visual report scores and alert capabilities. In addition, z/OS SMF/RMF workload data playback may be integrated into the customer profiling visualization tooling to provide additional and greater insight into key functional areas to further test and/or tune the test workload to meet "customer-like" attainment goals.

An operation in block 228 determines if the developed test workload meets the customer workload attainment goals for the various required characteristics. If the test workload does not meet the customer workload attainment goals for the various required characteristics, then the method branches back to the operation in block 220 to reiterate the operations in blocks 220 and 224 as necessary for additional test workload testing and/or tuning until the customer comparison attainment goals are met.

If the developed test workload meets the customer workload attainment goals for the various required characteristics, then an operation in block 232 determines if the developed test workload meets one or more customer workload attainment goals after a period of time; for example six months, 12 months, or some other period of time. If so, then the method 200 branches back to the operation in block 216. If not, then an operation in block 236 determines that the method should branch back to the operation in block 208.

Embodiments of the present invention allow a user to more accurately test customer workloads for various disciplines (e.g., software, hardware, firmware; specifically, the operating system software). In general, the test workloads need to be as representative or characteristic and encompassing as possible of the source customer workloads (i.e., be more "customer-like"). The target test workload needs to be reflective of the source general customer set workloads designated to be covered by the test workload, and include the common and unique characteristics of the target customer set workloads, where possible.

Embodiments of the present invention facilitate the design, development, testing, tuning, and maintaining of the test workload after the most important common and unique characteristics of the target customer workloads, employing a wide range of customer profiling and analytics tooling, processes, and analytics to optimize the effort. This includes using iterative workload modeling, testing, and tuning, historical and runtime workload data profiling comparisons, manual and automated tuning, and modifying workload components to attain these core customer workload characteristics goals.

These core customer workload factors, characteristics, or metrics that may be incorporated into the target "customer-like" test workload include without limitation: functional coverage; activity levels and performance indicators including response times, transaction rates, counters (including minimum/maximum/mean/standard deviation), etc.; scalability; reliability; availability; serviceability; error recoverability; complexity; portability; benchmarks including by industry, discipline, software, etc.; upgrades and migrations capabilities; product install combinations; environment configurations, including: hardware, software, firmware; server, Sysplex, LPAR, Adapter, etc.; z/OS, zVM, zLinux, etc.; cloud (compute, storage, network); compute; storage; network; and problem discovery and defect identification.

In addition to the design, development, testing, and tuning of the "customer-like" test workload, the test workload must also be regularly maintained to stay current with and incorporate the evolving customer business changes contained in these customer workloads. This requires ongoing, iterative uses of these runtime and historical customer profiling and analytics tools, processes, and analytics, continually working to stay reflective of the source customer workloads.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value.

Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by a processor, characteristics of one or more customer workloads to be incorporated into a customer-like test workload;
   determining, by the processor, one or more data points for environment and workload comparisons;
   collecting, by the processor, customer environment, workload, capacity and performance empirical data for normal and high activity workload periods, for one or more days and across multiple time frames, wherein the multiple time frames comprise one or more of quarter-ends, year-ends, heavy retail days, heavy banking days and holidays, wherein collecting customer environment, workload, capacity and performance empirical data comprises collecting a standard set of record types that provide individual system configuration, environment and utilization views;
   developing, by the processor, a test workload;
   conducting, by the processor, historical and run-time workload profiling of the one or more customer workloads and the developed test workload to continually tune and adjust the developed test workload to meet one or more customer workload attainment goals, wherein the one or more customer attainment goals comprise functional coverage, stress and activity level customer workload characteristics; and
   responsive to determining, by the processor, that the developed test workload meets one or more customer workload attainment goals, determining that the developed workload meets one or more customer workload attainment goals following a predetermined amount of time.

2. The computer-implemented method of claim 1 further comprising determining, by the processor, that the developed test workload does not meet one or more customer workload attainment goals.

3. The computer-implemented method of claim 2 further comprising developing, by the processor, a test workload; and conducting, by the processor, historical and run-time workload profiling of the one or more customer workloads and the developed test workload, until it is determined, by the processor, that the developed test workload meets one or more customer workload attainment goals.

4. The computer-implemented method of claim 1 further comprising determining, by the processor, that the developed test workload meets one or more customer workload attainment goals after a period of time.

5. The computer-implemented method of claim 4 further comprising collecting, by the processor, customer environment, workload, capacity and performance empirical data; developing, by the processor, a test workload; and conducting, by the processor, historical and run-time workload profiling of the one or more customer workloads and the developed test workload.

6. The computer-implemented method of claim 1 further comprising determining, by the processor, that the developed test workload does not meet one or more customer workload attainment goals after a period of time.

7. The computer-implemented method of claim 6 further comprising determining, by a processor, one or more customer workloads' characteristics to be incorporated into a customer-like test workload; determining, by the processor, one or more data points for environment and workload comparisons; collecting, by the processor, customer environment, workload, capacity and performance empirical data; developing, by the processor, a test workload; conducting, by the processor, historical and run-time workload profiling of the one or more customer workloads and the developed test workload; and determining, by the processor, that the developed test workload meets one or more customer workload attainment goals.

8. A system comprising:
   a processor in communication with one or more types of memory, the processor configured to:
   determine characteristics of one or more customer workloads to be incorporated into a customer-like test workload;
   determine one or more data points for environment and workload comparisons;
   collect customer environment, workload, capacity and performance empirical data for normal and high activity workload periods, for one or more days and across multiple time frames, wherein the multiple time frames comprise one or more of quarter-ends, year-ends, heavy retail days, heavy banking days and holidays, wherein collecting customer environment, workload, capacity and performance empirical data comprises collecting a standard set of record types that provide individual system configuration, environment and utilization views;
   develop a test workload;
   conduct historical and run-time workload profiling of the one or more customer workloads and the developed test workload to continually tune and adjust the developed test workload to meet one or more customer workload attainment goals, wherein the one or more customer attainment goals comprise functional coverage, stress and activity level customer workload characteristics; and
   responsive to determining that the developed test workload meets one or more customer workload attainment goals, determine that the developed workload meets one or more customer workload attainment goals following a predetermined amount of time.

9. The system of claim 8 further comprising the processor configured to determine that the developed test workload does not meet one or more customer workload attainment goals.

10. The system of claim 9 further comprising the processor configured to develop a test workload; and conduct historical and run-time workload profiling of the one or more customer workloads and the developed test workload, until it is determined, by the processor, that the developed test workload meets one or more customer workload attainment goals.

11. The system of claim 8 further comprising the processor configured to determine that the developed test workload meets one or more customer workload attainment goals after a period of time.

12. The system of claim 11 further comprising the processor configured to collect customer environment, workload, capacity and performance empirical data; to develop a test workload; and to conduct historical and run-time workload profiling of the one or more customer workloads and the developed test workload.

13. The system of claim 8 further comprising the processor configured to determine that the developed test workload meets one or more customer workload attainment goals after a period of time.

14. The system of claim 13 further comprising the processor configured to determine one or more customer workloads' characteristics to be incorporated into a customer-like test workload; to determine one or more data points for environment and workload comparisons; to collect customer environment, workload, capacity and performance empirical data; to develop a test workload; conduct historical and run-time workload profiling of the one or more customer workloads and the developed test workload; and to determine that the developed test workload meets one or more customer workload attainment goals.

15. A computer program product comprising:
a non-transitory storage medium readable by a processing circuit and storing instructions for execution by the processing circuit for performing a method comprising:
determining characteristics of one or more customer workloads to be incorporated into a customer-like test workload
determining one or more data points for environment and workload comparisons;
collecting customer environment, workload, capacity and performance empirical data for normal and high activity workload periods, for one or more days and across multiple time frames, wherein the multiple time frames comprise one or more of quarter-ends, year-ends, heavy retail days, heavy banking days and holidays, wherein collecting customer environment, workload, capacity and performance empirical data comprises collecting a standard set of record types that provide individual system configuration, environment and utilization views;
developing a test workload;
conducting historical and run-time workload profiling of the one or more customer workloads and the developed test workload to continually tune and adjust the developed test workload to meet one or more customer workload attainment goals, wherein the one or more customer attainment goals comprise functional coverage, stress and activity level customer workload characteristics; and
responsive to determining that the developed test workload meets one or more customer workload attainment goals, determining that the developed workload meets one or more customer workload attainment goals following a predetermined amount of time.

16. The computer program product of claim 15 further comprising determining that the developed test workload does not meet one or more customer workload attainment goals.

17. The computer program product of claim 16 further comprising developing a test workload; and conducting historical and run-time workload profiling of the one or more customer workloads and the developed test workload, until it is determined that the developed test workload meets one or more customer workload attainment goals.

18. The computer program product of claim 15 further comprising determining that the developed test workload meets one or more customer workload attainment goals after a period of time.

19. The computer program product of claim 18 further comprising collecting customer environment, workload, capacity and performance empirical data; developing a test workload; and conducting historical and run-time workload profiling of the one or more customer workloads and the developed test workload.

20. The computer program product of claim 15 further comprising determining that the developed test workload meets one or more customer workload attainment goals after a period of time.

* * * * *